Feb. 27, 1934.                    H. OLIN                    1,948,731
WATER HEATER
Filed Aug. 20, 1931
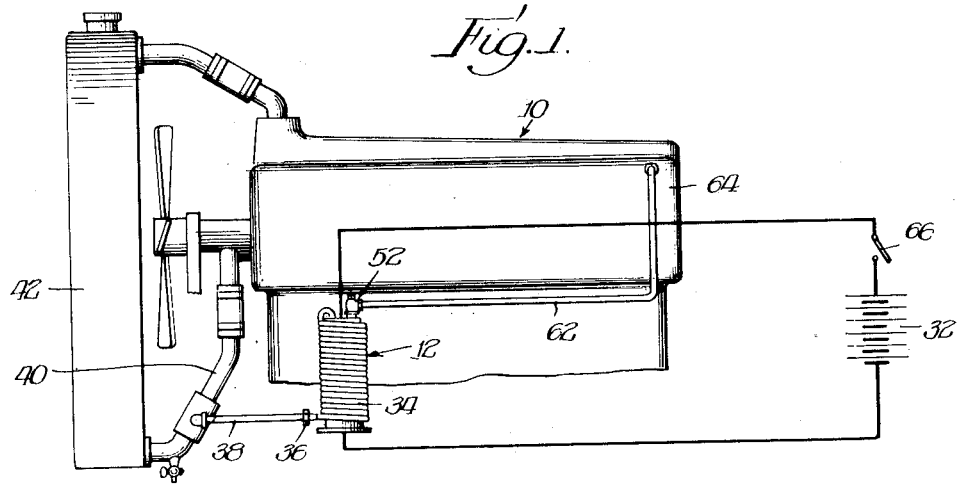
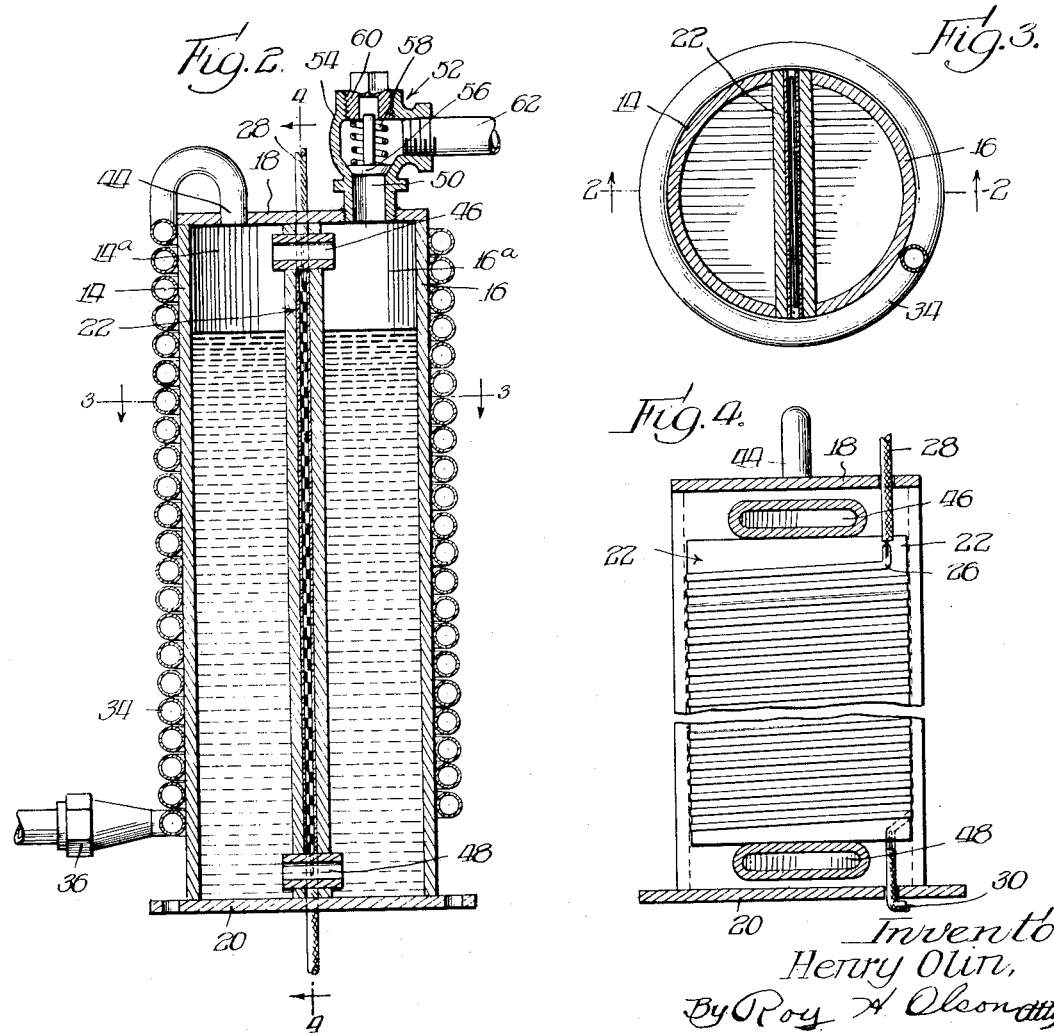
Inventor:
Henry Olin,
By Roy A. Olson Atty.

Patented Feb. 27, 1934

1,948,731

UNITED STATES PATENT OFFICE

1,948,731

WATER HEATER

Henry Olin, Minneapolis, Minn.

Application August 20, 1931. Serial No. 558,253

6 Claims. (Cl. 219—38)

My invention relates generally to water heaters and more particularly to heaters which are electrically controlled.

It is one of the primary objects of my invention to provide a heater which will enable a fluid body, such as the body of water contained within the cylinder jackets of an internal combustion engine, to be heated very quickly with a minimum amount of power.

Another object of my invention is to provide a heater as above set forth, which is positive in action and is composed of elements which are simple in construction and few in number.

Still another object of my invention is to provide a heater which is adapted to rapidly heat a relatively small volume of water, automatically transfer the heated water or vapor to the part which is to be heated, and contemporaneously heat another volume of water, whereby in rapid succession said heated volume of water may be transferred in such a manner as to effect the ultimate expeditious heating of the main fluid body, as, for example, the water within the cylinder jacket.

It is another object of my invention to provide a heater of the type set forth above, which is designed to generate steam within a confined area, and when a predetermined pressure has been attained, to automatically introduce said steam within the main fluid body for the purpose of heating same.

More specifically, my invention contemplates the provision of an improved practical steam heating device which is adapted to introduce in automatic succession quantities of steam from a relatively small fluid body into the main fluid body, whereby to effect a relatively quick rise in the temperature thereof.

Still more specifically, my invention contemplates a steam heating device as mentioned above, in which an electrical heating element is associated with a fluid container surrounded by a fluid conducting coil, and a valve is so arranged as to permit the discharge of steam from the container into the main fluid body when a predetermined pressure is established.

The foregoing and numerous other objects and advantages will be apparent from the following description when considered in connection with the accompanying drawing, wherein—

Figure 1 discloses a fragmentary internal combustion engine equipped with a heating system or device which is representative of one embodiment of my invention;

Figure 2 is a central vertical sectional view of the heater proper, said view being taken substantially along the line 2—2 of Figure 3;

Figure 3 is a horizontal transverse sectional view taken substantially along the line 3—3 of Figure 2; and Figure 4 is a fragmentary view of the heating element and certain of the associated parts, said view being taken substantially along the line 4—4 of Figure 2.

Referring now to the drawing, wherein like numerals have been employed to designate similar parts throughout the various figures, it will be seen that for the purpose of illustrating one practical application of my invention, I have shown the same in operative association with an internal combustion engine designated generally by the numeral 10, Figure 1. One embodiment of my invention comprises a water heating device designated generally by the numeral 12, which includes a pair of semi-cylindrical casings or containers 14 and 16, Figures 2 and 3. These containers are closed at opposite ends by means of plates 18 and 20, and are spaced apart sufficiently to permit of the insertion therebetween of a suitable electrical heating element 22. In the drawing I have disclosed the heating element or unit 22 as comprising a central insulating plate 24 and a strip of conducting material 26 wrapped around this plate, as clearly shown in Figure 4. Suitable conductors 28 and 30 connected with opposite ends of the conductor 26 serve to couple the heating element or unit with any source of electrical power supply, as, for example, the battery 32 disclosed in Figure 1.

Coiled upon the peripheral surfaces of the casings or containers 14 and 16 is a conduit or pipe 34 having an inlet coupling 36 which is adapted to be connected through the medium of a pipe 38 with the lower part of the water cooling system of the internal combustion engine 10. As shown in Figure 1, this pipe 38 communicates with the water cooling system through the conduit 40, which forms the return conduit for the water which passes out of the bottom of the radiator 42. The coil 34 has an outlet 44 which is located in the plate 18 at the upper end of the container 14. Fluid passing through the coil 34 is introduced within the upper end of the container 14, and it will be seen that I provide suitable channels 46 and 48, which serve to establish communication between the chamber 14a of the container 14 and the chamber 16a of the container 16. It will be apparent that the heating element or unit 22 serves to heat the fluid within the chambers 14a and 16a, and steam which is ultimately generated within the chambers, passes through a channel 50 provided within a valve mechanism designated generally by the numeral 52.

This valve mechanism 52 includes a casing or housing 54 and a valve member 56 which is normally seated through the agency of a coiled spring 58. A threaded plug 60 is positioned at the upper end of the valve member 56 and serves as an abutment for one end of the spring 58. A suitable conduit or pipe line 62 serves to conduct liquid from the valve mechanism 52 to the fluid body which is to be heated. In the present instance I have disclosed this pipe line 62 connected between the valve mechanism 52 and the upper portion of the water jacekt 64 of the internal combustion engine 10, Figure 1. The valve member 56 is so arranged that it will open only when a predetermined steam pressure has been established within the heating device 12.

In the operation of the above described mechanism a suitable switch 66 may be closed to effect the energizing of the electrical heating element 22. The heating of this element serves to not only heat the fluid within the chambers 14a and 16a, but also to heat the incoming fluid located within the coil 34. Upon the establishment of a predetermined steam pressure within the chambers, the valve member 56 rises so as to permit the steam or liquid to pass into the pipe line 62 and thence into the water jacket 64. The water head established by the fluid within the radiator 42 positively prevents the backing up of the fluid within the coil 34 as a result of the development of steam pressure within the chambers 14a and 16a. In other words, the fluid within the coil 34 provides a seal to prevent the egress of steam therethrough, and thus insures the positive actuation of the valve member 56. Obviously as soon as the steam pressure within the chambers 14a and 16a has been reduced as a result of the sudden opening of the valve member 56, said member will close through the action of the coiled spring 58, thereby preventing the steam introduced within the pipe line 62 from backing up into the chamber 16a. From the foregoing description it will be apparent that the valve 56 serves as a check valve to permit the intermittent introduction of steam or liquid within the pipe line 62. The opening and closing of the valve 56 take place with sufficient rapidity so as to effect the relatively quick heating of the fluid within the water jacket 64. As the steam is generated and delivered through the pipe line 62, fluid from the lower portion of the cooling system of the internal combustion engine 10 automatically flows through the conduit or pipe 38 and thence through the coil 34 into the chamber 14a. The channels 46 and 48 enable the free circulation of the fluid from one chamber to another and thereby expedite the heating of said fluid.

The foregoing invention readily lends itself for use in connection with automobile internal combustion engines. Its action as a heater is very positive and requires a very short period to effect the heating of the fluid in the motor jacket. My improved type of heater is particularly adaptable for use in localities where the winter season is rather severe and of long duration, because it will operate efficiently under the most severe climatic conditions. The switch 66 may be conveniently located on the dash of the automobile, and it will be apparent that the compactness and simplicity of the device enable it to be applied to any motor without materially modifying any of the engine parts. In fact, it is only necessary, in order to install my improved heater, to provide a mounting for the containers and pipe connections extending from the lower portion of the cooling system to the upper portion of the water jacket. The simplicity in structural characteristics, the ease with which it may be installed, and the efficiency in operation render my improved system of heating very practical. The parts are few in number and may be assembled at a very low cost, thereby enabling the entire unit to be sold at a very reasonable price.

Obviously my invention is not limited to the particular structural arrangement disclosed in the drawing, but is capable of numerous other modifications and changes without departing from the spirit and scope of the appended claims.

Having thus described my invention, what I claim as new and desire to secure by Letters Patent is:

1. A water heater adapted for heating fluid within the water jacket of an internal combustion engine including a fluid container, means for directing fluid from the water cooling circuit of said engine to said container, means for heating the fluid within said container, valve means responsive to pressure conditions within the container for automatically controlling the successive discharge of heated liquid therefrom, and means for connecting said valve means with the water jacket of said engine.

2. A water heater adapted for heating fluid within the water jacket of an internal combustion engine including a fluid container, means for directing fluid from the water cooling circuit of said engine to said container, means for heating the fluid within said container, valve means adapted to open in response to a predetermined steam pressure within the container to permit the escape of steam from said container, and means connecting said valve means with the water jacket of said engine.

3. A water heater adapted for heating fluid within the water jacket of an internal combustion engine including a fluid container, means for directing fluid from the water cooling circuit of said engine to said container, said means including a coil surrounding said container and opening into the top thereof, means for heating the fluid within said container, valve means responsive to pressure conditions within the container for automatically controlling the successive discharge of heated liquid therefrom, and means for connecting said valve means with the water jacket of said engine.

4. A water heater adapted for heating fluid within the water jacket of an internal combustion engine including a fluid container, means for directing fluid from the water cooling circuit of said engine to said container, said means including a coil surrounding said container and opening into the top thereof, an electrical element for heating the fluid within the container, valve means responsive to pressure conditions within the chamber for automatically controlling the successive discharge of heated liquid therefrom, and means for connecting said valve means with the water jacket of said engine.

5. A water heater adapted for heating fluid within the water jacket of an internal combustion engine including a fluid container, means for directing fluid from the water cooling circuit of an engine to said container, means for heating fluid within said container, and means including a restricted passageway for automatically controlling the successive discharge of steam from said container, and means for connecting said control means with a fluid body to be heated.

6. A water heater including a container of a size adapted to be mounted beneath the hood of an automobile, means for directing water from the cooling system of an automobile into said container, means for heating fluid within the container to generate steam, means for directing steam from said container to the fluid to be heated such as the liquid within the water jacket of an internal combustion engine, and means interposed between said last mentioned fluid directing means and said container to effect an automatic intermittent discharge of steam from said container.

HENRY OLIN.